Patented Oct. 29, 1929

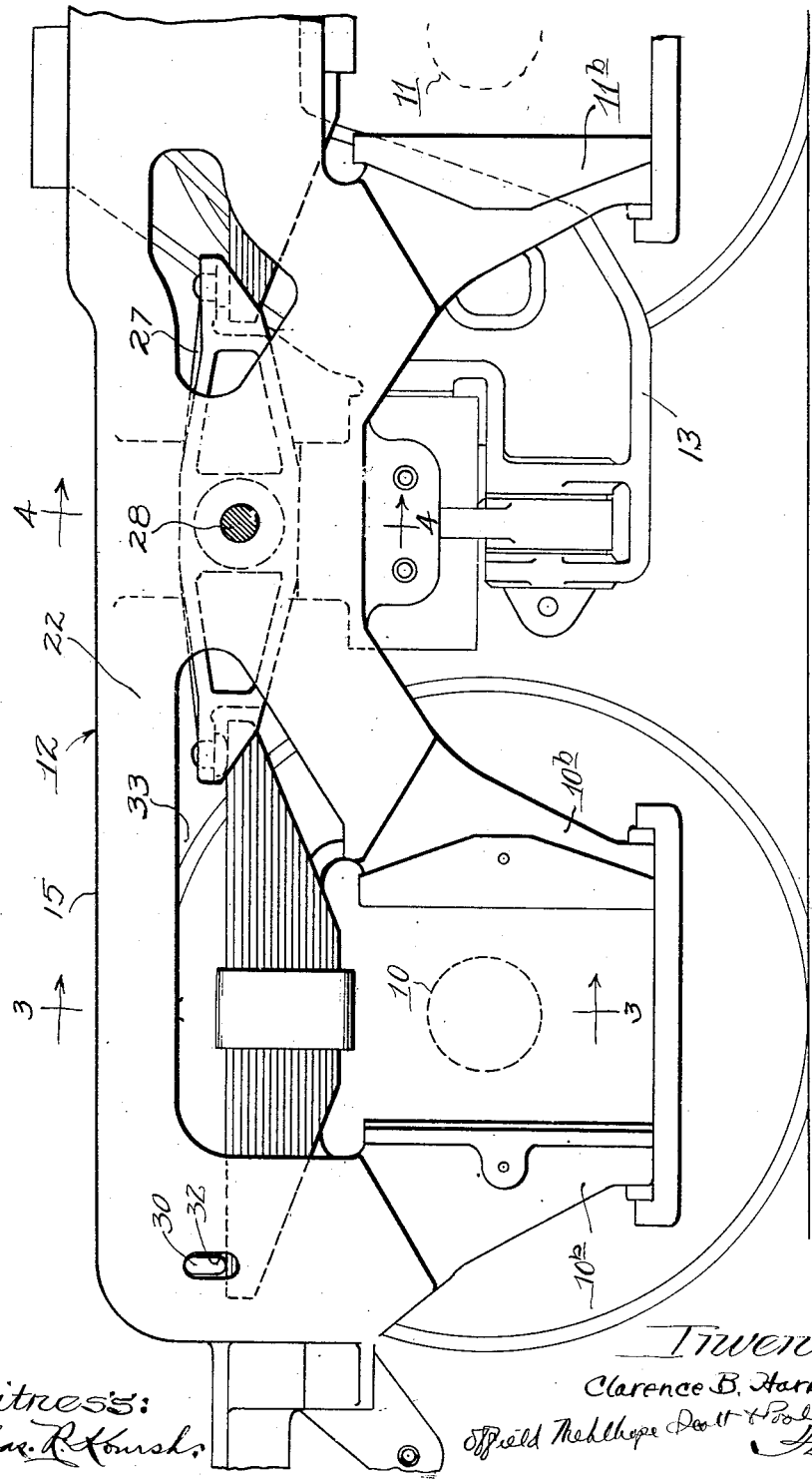

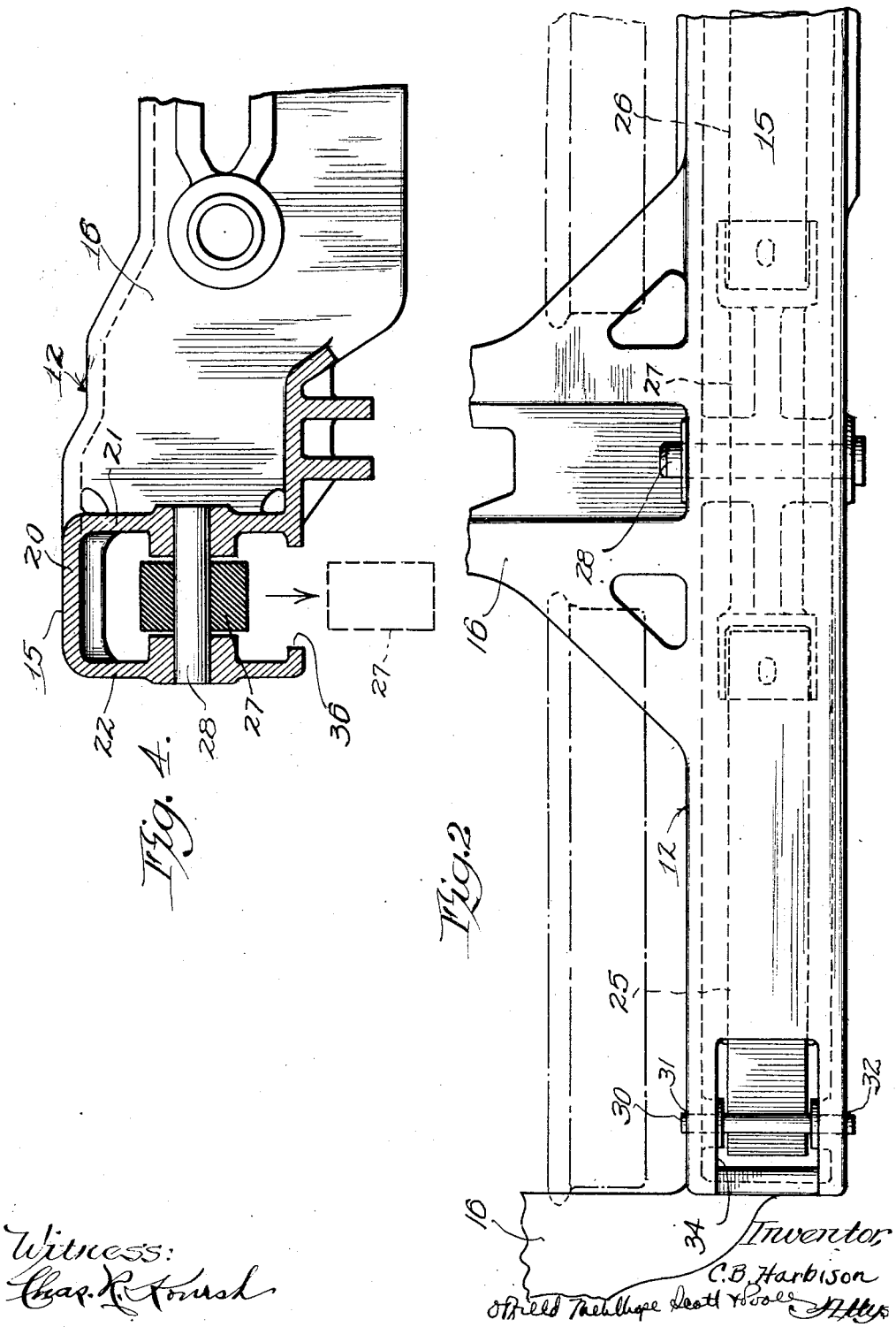

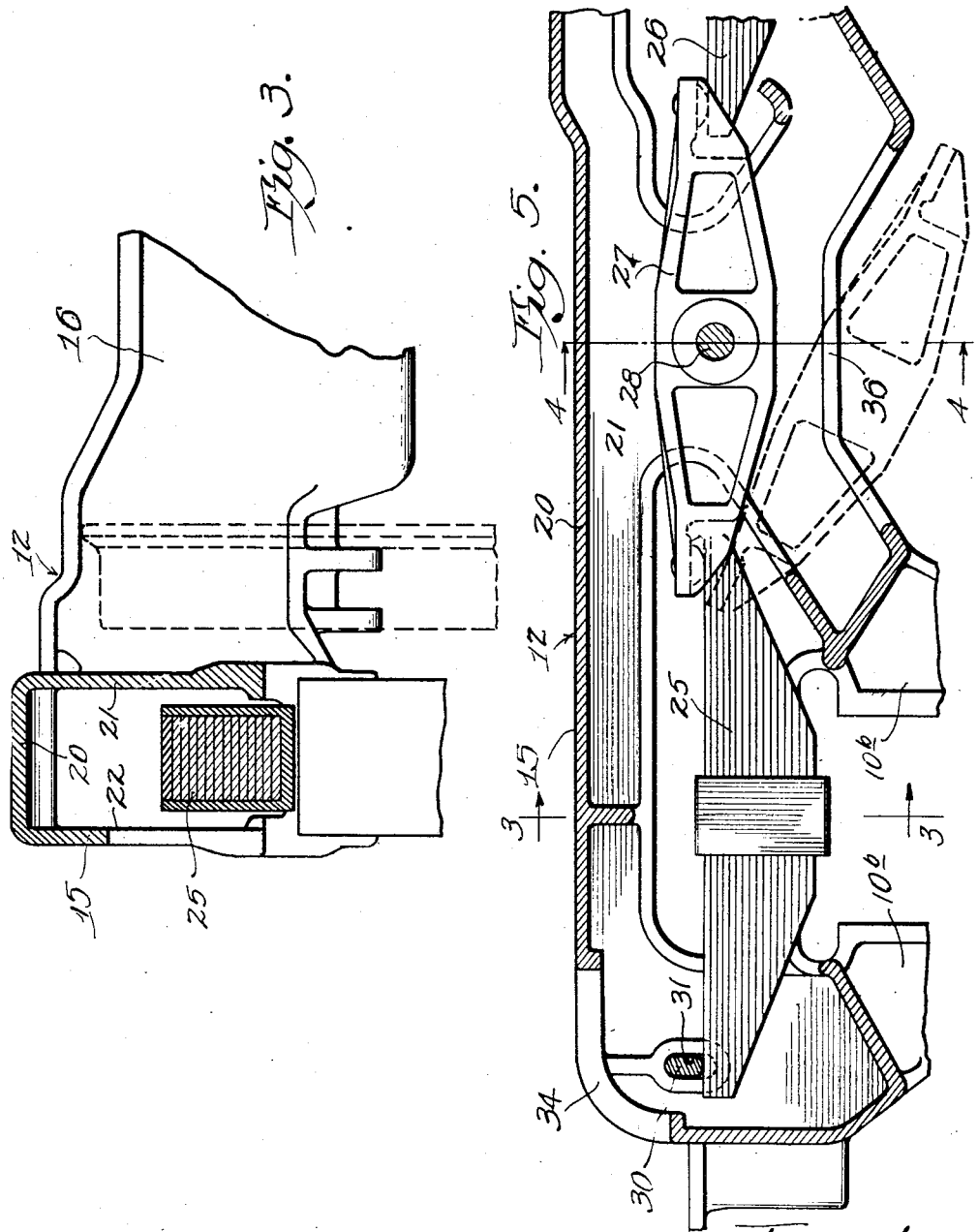

1,733,344

UNITED STATES PATENT OFFICE

CLARENCE B. HARBISON, OF LIMA, OHIO, ASSIGNOR TO THE OHIO STEEL FOUNDRY COMPANY, OF LIMA, OHIO, A CORPORATION OF OHIO

TRUCK FRAME

Application filed July 28, 1927. Serial No. 208,907.

This invention relates to improvements in railway truck frames, and more particularly to cast steel truck frames having three axles, and has for its principal object to provide a new and improved frame construction of the required strength and rigidity, and affording means to permit the springs and equalizers to be readily applied to or removed from the body of the frame.

The invention may best be understood by referring to the accompanying drawings, in which Figure 1 is a side view of a six wheel truck constructed in accordance with my invention, with one axle and a portion of the frame omitted at one end thereof.

Figure 2 is a plan view of the portions of the frame shown in Figure 1.

Figure 3 is a section taken on line 3—3 of Figure 1.

Figure 4 is a section taken on line 4—4 of Figure 1.

Figure 5 is a longitudinal section of the side frame and indicating the manner in which the springs and equalizers may be removed therefrom.

Referring to details shown in the various figures, the truck is of the familiar three-axle or six-wheel type, but since the two opposite ends are similar, only a little more than one-half of the truck frame is shown to include one end axle 10 and the center axle 11, with their respective journal boxes, the latter of which for clarity of illustration are not shown, while the axles and their supporting wheels are indicated only in dotted lines. The frame, indicated generally at 12, is connected to a bolster 13, herein of the well-known swinging type. The entire frame is of cast steel including a side frame member 15 jointed to a similar opposite side frame member (not shown) by cross members 16, 16, a portion only of which are shown herein.

Referring more particularly to the construction of the side frame 15 and its spring rigging, which form the subject matter of the present invention, it will be seen that said side frame is formed in general of a hollow longitudinally disposed member including top wall 20, inner wall 21 and outer wall 22. The three walls mentioned form generally an inverted U-shaped cross section, as best shown in Figures 3 and 4, and contain therein spring rigging and equalizers of a well-known form, including end spring 25, center spring 26, and equalizer bars 27 pivotally mounted on pin 28. Adjacent each end, and at the center of said side frame, are depending pairs of pedestal members $10^b$—$10^b$ and $11^b$—$11^b$ respectively, between which the journal boxes are supported for vertical movement in the usual manner.

Means for mounting the outer end of the end spring 25 comprises a key 30 which is detachably supported in apertures 31—32 formed in the inner and outer walls 21 and 22 of the side frame at a point below the upper wall 20, as clearly shown in Figures 1 and 2. The end of the spring therefore bears against the key which in turn bears against the frame and eliminates the use of spring hangers at this point. At the same time it permits the key to be removed or inserted from either the inside or outside of the truck frame when the load is removed from the spring, and also permits wider latitude of movement of the spring in order to remove the latter from the frame, as will now be described.

In order to permit the end spring 25 to be readily applied or removed, an elongated opening 33 is provided in the outer wall 22 immediately above the pedestals $10^b$—$10^b$ and extending inwardly toward the center wheel to a point beyond the inner end of said spring, as clearly shown in Figure 1. Another opening 34 is provided extending over the outer end and top of the frame member adjacent the key 30 to permit access to the outer end of the spring for mounting or dismounting the latter. With the arrangement above described, the spring 25 may be readily removed sidewise through the opening 33, for this purpose the inner end being first dismounted from its engaging position with the equalizer bar 27 and then turned sidewise and removed from the opening.

In order to remove the center spring 26 and equalizer bar 27, the frame has a downwardly opening aperture 36 between the adjacent pedestal members 10ᵇ—11ᵇ and below the equalizer bar 27. The latter bar may be readily dismounted by removing its pin 28 whereupon said bar may be removed through the aperture 36 as is best indicated in Figure 5. Thereafter the spring 26 may also be removed through this aperture 36.

A truck frame casting formed as above described combines great strength and rigidity with greatly increased accessibility to the spring rigging for inspection, removal or replacement thereof.

Although I have illustrated and described the particular embodiment of my invention, it will be understood that I do not wish to be limited to the exact construction shown and described, but that various changes and modifications may be made without departing from the spirit and scope of my invention as expressed in the following claims.

I claim:

1. In a truck, a frame casting including a hollow side frame member and having pedestal openings, spring rigging mounted in said side frame member including a leaf spring adapted to have supporting engagement with one of the truck axles, said side frame member being provided with an elongated opening through its outer wall about its respective pedestal opening to permit said spring to be moved laterally through said opening for application to or removal from said frame.

2. In a truck, a frame casting including a hollow side frame member having pedestal openings, spring rigging mounted in said side frame member therein including a leaf spring adapted to have supporting engagement with one of the truck axles, said side frame member being provided with an elongated opening through its outer wall about its respective pedestal opening to permit said spring to be removed from or applied to said frame laterally through said opening, and means for supporting one end of said spring including a removable key extending between opposite side walls of said hollow frame member.

3. In a truck, a frame casting including a hollow side frame provided with depending pedestals, equalizer rigging disposed in said side frame above said pedestals, including an equalizer bar, said side frame member having a downwardly opening aperture between adjacent pairs of said pedestals to permit said equalizer bar to be removed.

4. In a truck, a frame casting including a hollow side frame provided with depending pedestals, equalizer rigging disposed in said side frame above said pedestals, including a pivotally mounted equalizer bar, said side frame member having a downwardly opening aperture between adjacent pairs of said pedestals to permit said equalizer bar to be removed.

5. In a truck, a frame casting including a hollow side frame provided with depending pedestals, equalizer rigging disposed in said side frame above said pedestals, including an equalizer bar, and a spring adapted to have supporting engagement with an adjacent axle, said side frame member having a downwardly opening aperture between adjacent pairs of said pedestals to permit said equalizer bar and spring to be removed.

6. In a truck, an integral cast frame including a hollow side frame member provided with depending pedestals, spring rigging disposed in said side frame member including springs and connecting equalizers, means for supporting the ends of said spring rigging including a removable key extending between opposite walls of said hollow frame member, said frame member having means affording removal of said springs and bars, including an elongated opening through the outer wall adjacent one of said end springs to permit lateral removal of the latter, and a downwardly opening aperture between adjacent pairs of pedestals permitting removal of other parts of said spring rigging.

Signed at Chicago, Ill., this 12th day of July, 1927.

CLARENCE B. HARBISON.